(12) United States Patent
Takakura (10) Patent No.: US 10,870,342 B2
(45) Date of Patent: Dec. 22, 2020

(54) VIBRATION ISOLATOR

(71) Applicant: BRIDGESTONE CORPORATION, Tokyo (JP)

(72) Inventor: Tomoki Takakura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 96 days.

(21) Appl. No.: 16/300,126

(22) PCT Filed: Jun. 2, 2017

(86) PCT No.: PCT/JP2017/020657
§ 371 (c)(1),
(2) Date: Nov. 9, 2018

(87) PCT Pub. No.: WO2017/213049
PCT Pub. Date: Dec. 14, 2017

(65) Prior Publication Data
US 2019/0143800 A1    May 16, 2019

(30) Foreign Application Priority Data

Jun. 7, 2016 (JP) .................................. 2016-113838

(51) Int. Cl.
*B60K 5/12* (2006.01)
*F16F 15/08* (2006.01)
*F16F 1/36* (2006.01)

(52) U.S. Cl.
CPC .............. *B60K 5/1208* (2013.01); *B60K 5/12* (2013.01); *F16F 1/36* (2013.01); *F16F 15/08* (2013.01)

(58) Field of Classification Search
CPC .. B60K 5/12; B60K 5/1208; F16F 1/36; F16F 1/373; F16F 1/376; F16F 15/08; F16F 1/54; F16F 1/371

(Continued)

(56) References Cited

U.S. PATENT DOCUMENTS 6,199,841 B1    3/2001  Dandre et al.
6,349,918 B1 *  2/2002  Bunker ................ B60K 5/1208
                                                    248/635

(Continued)

FOREIGN PATENT DOCUMENTS

CN    101168347 A    4/2008
CN    104890491 A    9/2015

(Continued)

OTHER PUBLICATIONS

Communication dated Mar. 8, 2019, from the European Patent Office in counterpart European Application No. 17810227.3.

(Continued)

*Primary Examiner* — Thomas W Irvin
(74) *Attorney, Agent, or Firm* — Sughrue Mion, PLLC (57) ABSTRACT

The vibration isolator includes: a first attachment member to be attached to one of a vibration generating unit or a vibration receiving unit; a second attachment member to be attached to another of the vibration generating unit or the vibration receiving unit; an elastic member that is provided at the second attachment member and elastically connects the first attachment member and the second attachment member; a convex portion protruded toward the first attachment member with reference to the outer surface of the elastic member opposed to the first attachment member; and a concave portion that is recessed at a region of the outer surface positioned on the base end side of the convex portion, that forms an extension portion at a side wall portion of the convex portion, and forms an opposed face opposed to the extension portion.

15 Claims, 10 Drawing Sheets

(58) Field of Classification Search
USPC .......................................................... 267/141
See application file for complete search history.

(56) References Cited

U.S. PATENT DOCUMENTS

| | | | |
|---|---|---|---|
| 6,427,989 | B1 | 8/2002 | Hashimoto et al. |
| 7,055,811 | B2 | 6/2006 | Ihara et al. |
| 8,579,269 | B2* | 11/2013 | Takakura .............. F16F 1/3849 |
| | | | 267/140.13 |
| 9,618,078 | B2* | 4/2017 | Kondo ..................... F16F 1/36 |
| 9,643,480 | B2* | 5/2017 | Bujak .................. B60K 5/1208 |
| 10,119,593 | B2* | 11/2018 | Kojima .................... F16F 15/08 |
| 10,203,012 | B2* | 2/2019 | Scharf ................... F16F 1/3849 |
| 10,302,166 | B2* | 5/2019 | Kadowaki ............. F16F 1/3849 |
| 10,337,585 | B2* | 7/2019 | Kojima .................... B60K 5/12 |
| 10,611,227 | B2* | 4/2020 | Kim ..................... B60K 5/1233 |
| 2005/0098374 | A1* | 5/2005 | Moon ....................... F16F 1/54 |
| | | | 180/312 |
| 2006/0043656 | A1* | 3/2006 | Shimizu ................ F16F 1/3849 |
| | | | 267/140.11 |
| 2008/0099966 | A1 | 5/2008 | Kim |
| 2010/0059912 | A1* | 3/2010 | Takakura ............. B60K 5/1208 |
| | | | 267/140.12 |
| 2011/0031669 | A1* | 2/2011 | Sasaki .................... F16F 1/371 |
| | | | 267/292 |
| 2014/0084526 | A1 | 3/2014 | Watanabe |
| 2015/0129742 | A1 | 5/2015 | Okanaka et al. |
| 2015/0252871 | A1* | 9/2015 | Kondo ...................... F16F 1/36 |
| | | | 267/141 |
| 2017/0211648 | A1* | 7/2017 | Kadowaki ............. F16F 1/3849 |
| 2017/0299007 | A1* | 10/2017 | Scharf ................... F16F 1/3849 |
| 2017/0299013 | A1* | 10/2017 | Kojima .................... F16F 15/08 |
| 2019/0264768 | A1* | 8/2019 | Kojima .................... F16F 1/387 |
| 2019/0291561 | A1* | 9/2019 | Nozaki ................ B60K 5/1208 |

FOREIGN PATENT DOCUMENTS

| | | |
|---|---|---|
| JP | 2014-066334 A | 4/2014 |
| JP | 2014-163487 A | 9/2014 |
| JP | 2015-064051 A | 4/2015 |
| JP | 2015-169263 A | 9/2015 |
| WO | WO-2016023859 A1 * | 2/2016 ............ F16F 1/3849 |

OTHER PUBLICATIONS

International Search Report for PCT/JP2017/020657, dated Aug. 29, 2017.

Search Report dated Dec. 3, 2019 issued by the China National Intellectual Property Administration in counterpart Application No. 2017800340306.

* cited by examiner

VIBRATION ISOLATOR

CROSS REFERENCE TO RELATED APPLICATIONS

This Application is a National Stage of International Application No. PCT/JP2017/020657 filed Jun. 2, 2017, claiming priority based on Japanese Patent Application No. 2016-113838 filed Jun. 7, 2016.

TECHNICAL FIELD

The present disclosure relates to a vibration isolator configured to suppress vibration.

BACKGROUND ART

As disclosed in Japanese Patent Application Laid-Open (JP-A) No. 2014-066334, a vehicle is conventionally provided with a vibration isolator configured to suppress vibration generated at a power unit such as an engine, and the vibration isolator is provided between the power unit and the vehicle body.

An engine mount constituting such a vibration isolator is disposed inside an inner bracket. From the engine mount, an outer bracket is extended. The engine mount is provided with stopper rubber. A buffer projection protruded sideward from the stopper rubber is provided.

As a result, the buffer projection of the stopper rubber is configured to come into contact with the inner side surface of the inner bracket so as to suppress vibration when vibration from the power unit causes the engine mount to swing.

SUMMARY OF INVENTION

Technical Problem

However, in such a vibration isolator, input in a twisting direction may be applied to the buffer projection depending on the vibration state of the power unit, and durability against such input in the twisting direction is required.

It is an object of the present disclosure to provide a vibration isolator capable of enhancing the durability against input in the twisting direction.

Solution to Problem

A vibration isolator according to the disclosure includes: a first attachment member to be attached to one of a vibration generating unit or a vibration receiving unit; a second attachment member to be attached to another of the vibration generating unit or the vibration receiving unit; an elastic member that is provided at the second attachment member and elastically connects the first attachment member and the second attachment member; a convex portion protruded toward the first attachment member with reference to an outer surface of the elastic member opposed to the first attachment member; and a concave portion that is recessed at a region of the outer surface positioned on a base end side of the convex portion, that forms an extension portion at a side wall portion of the convex portion, and that forms an opposed face opposed to the extension portion.

Advantageous Effects of Invention

According to the disclosure, the durability against input in the twisting direction can be enhanced.

DESCRIPTION OF EMBODIMENTS

First Embodiment

The following description will explain a first embodiment of the present invention with reference to the drawings.

Figure 1:
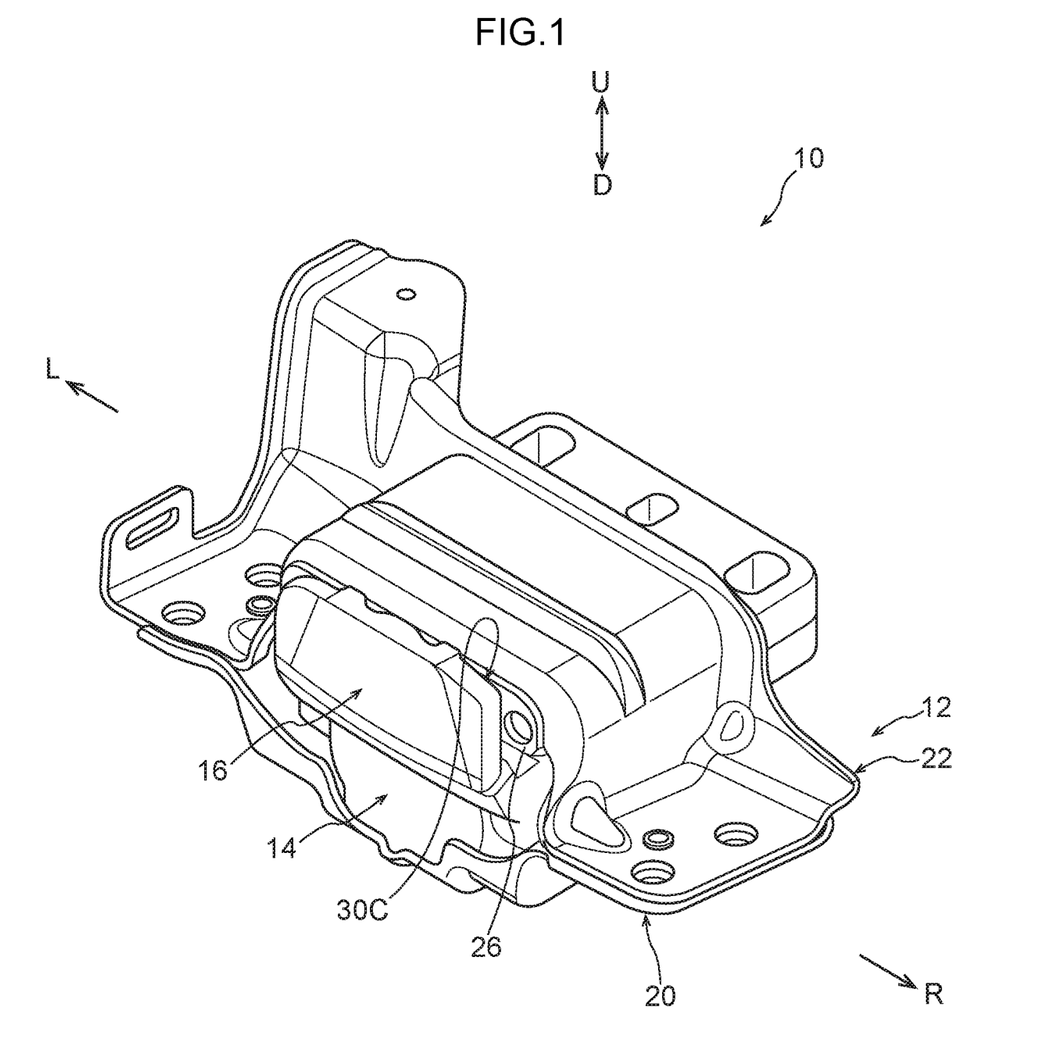
FIG. 1 is a perspective view illustrating a vibration isolator according to a first embodiment.

FIG. 1 is a view illustrating a vibration isolator 10 according to this embodiment. The vibration isolator 10 is attached to a pendulum suspension type vehicle and suppresses transmission of vibration of the engine to the vehicle body. In each figure, it is to be noted that U denotes an upper side, D denotes a lower side, L denotes a left side, and R denotes a right side. The directions indicated by these symbols are used for explanation, and do not indicate the usage state or the like of the vibration isolator 10.

Figure 2:
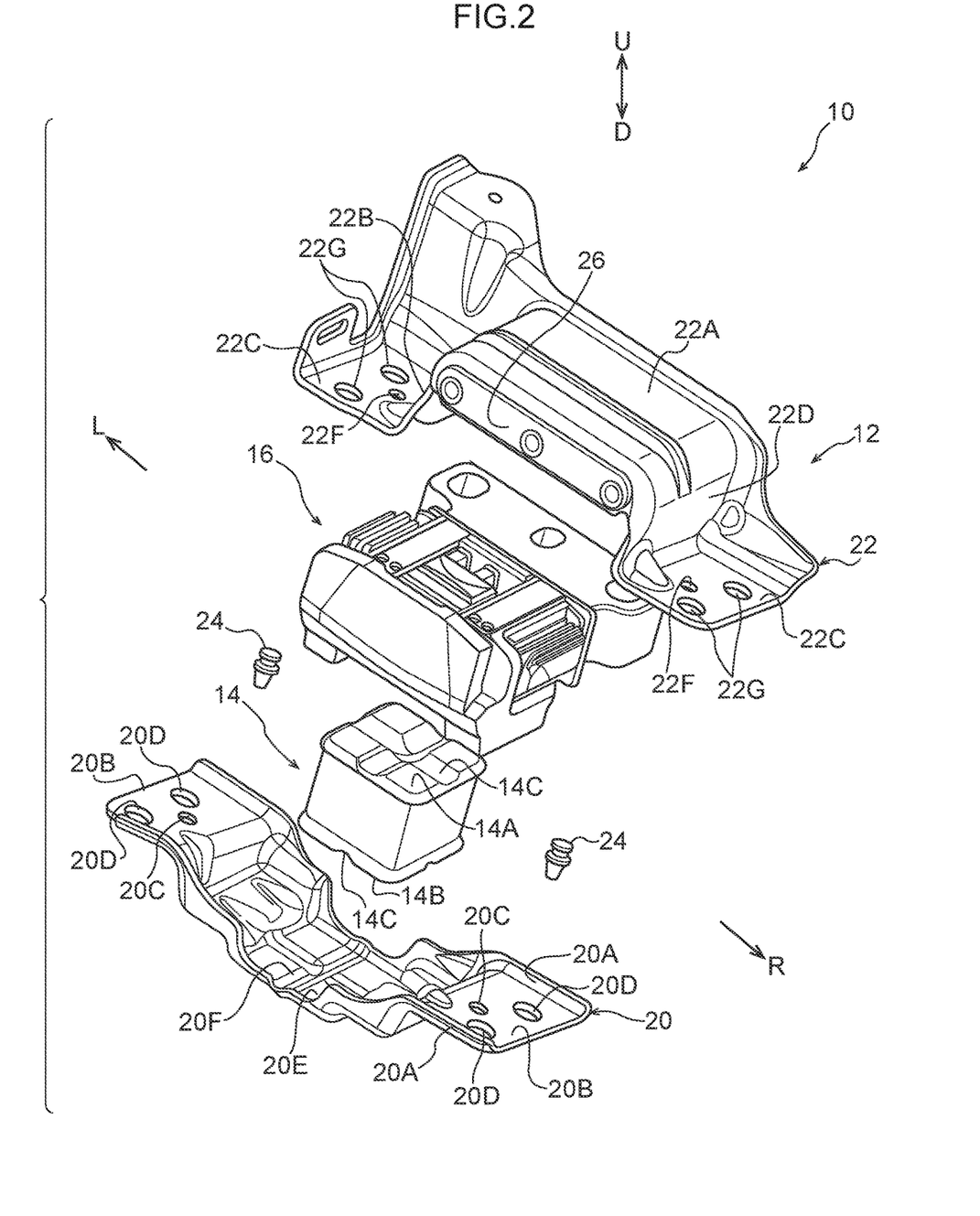
FIG. 2 is an exploded perspective view of the vibration isolator according to the first embodiment.

The vibration isolator 10 includes a first attachment member 12 to be attached to a vehicle body, which is an example of a vibration receiving unit. As also illustrated in FIG. 2, the first attachment member 12 is provided with a buffer block 14 and a second attachment member 16. The second attachment member 16 can be also referred to as a fixture. The second attachment member 16 is configured to be attached to a power unit, which is an example of a vibration generating unit. The power unit is composed of an engine and the like. The second attachment member 16 can be also referred to as a mount device.

Here, although this embodiment illustrates a case in which the first attachment member 12 is attached to the vehicle body that is an example of a vibration receiving unit and the second attachment member 16 is attached to the power unit that is an example of a vibration generating unit, the present invention is not limited to this. The first attachment member 12 may be attached to a vibration generating unit, and the second attachment member 16 may be attached to a vibration receiving unit.

As illustrated in FIG. 2, the first attachment member 12 is composed of a pair of metal brackets, i.e., a first bracket 20 and a second bracket 22.

The first bracket 20 is formed to have a hat-shaped cross section, and both side edges are each reinforced with a flange 20A. Each of end portions of the first bracket 20 in the longitudinal direction constitutes a fixing face 20B. Each fixing face 20B is provided with a rivet insertion hole 20C, and bolt insertion holes 20D to be used for fixing to the vehicle body. A central portion of the first bracket 20 in the longitudinal direction constitutes an attachment face 20E. On the attachment face 20E, a concave bead 20F, which bulges in a cross shape toward the lower side D opposite to the second bracket 22, is formed.

The second bracket 22 is also formed to have a substantially hat-shaped cross section and has an attachment face 22A constituting a central portion in the longitudinal direction. A left vertical wall 22B, which is an example of a contact region, is extended from a left end portion of the attachment face 22A toward the lower side D, and a fixing face 22C is extended from the left vertical wall 22B toward the left side L. A right vertical wall 22D, which is an example of a contact region, is extended from a right end portion of the attachment face 22A toward the lower side D, and a fixing face 22C is extended from the right vertical wall 22D toward the right side R.

Figure 3:
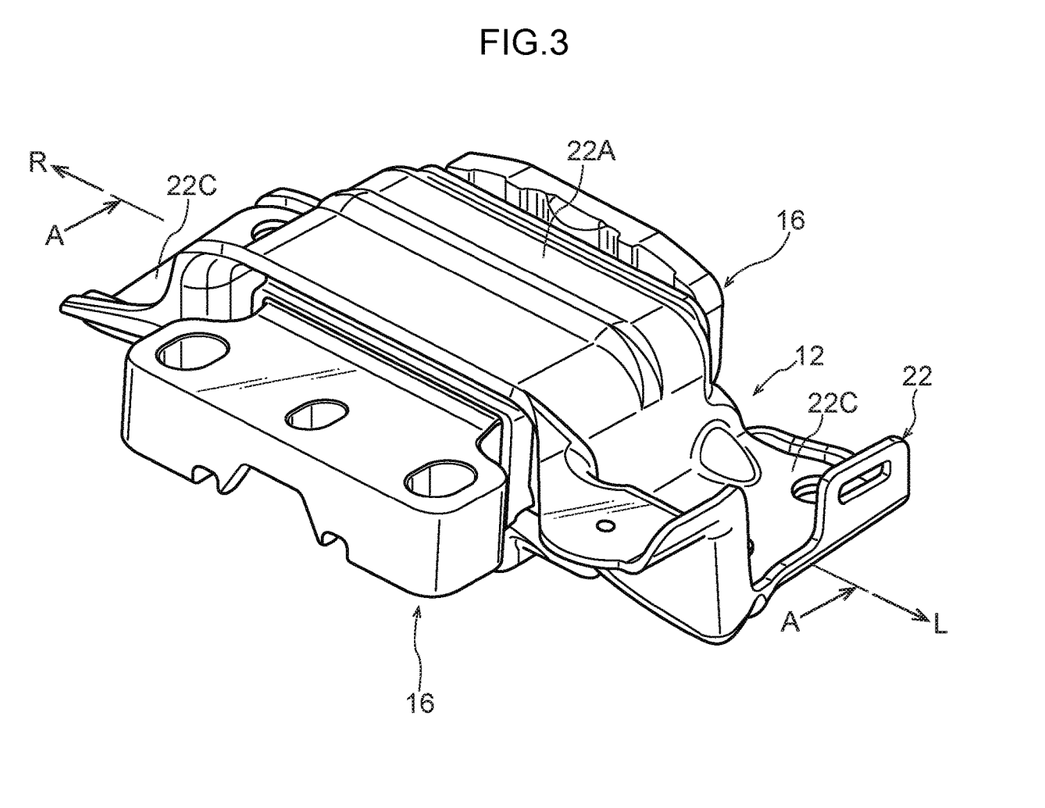
FIG. 3 is a perspective view of the vibration isolator according to the first embodiment viewed from a fixing portion side of a second attachment member.
Figure 4:
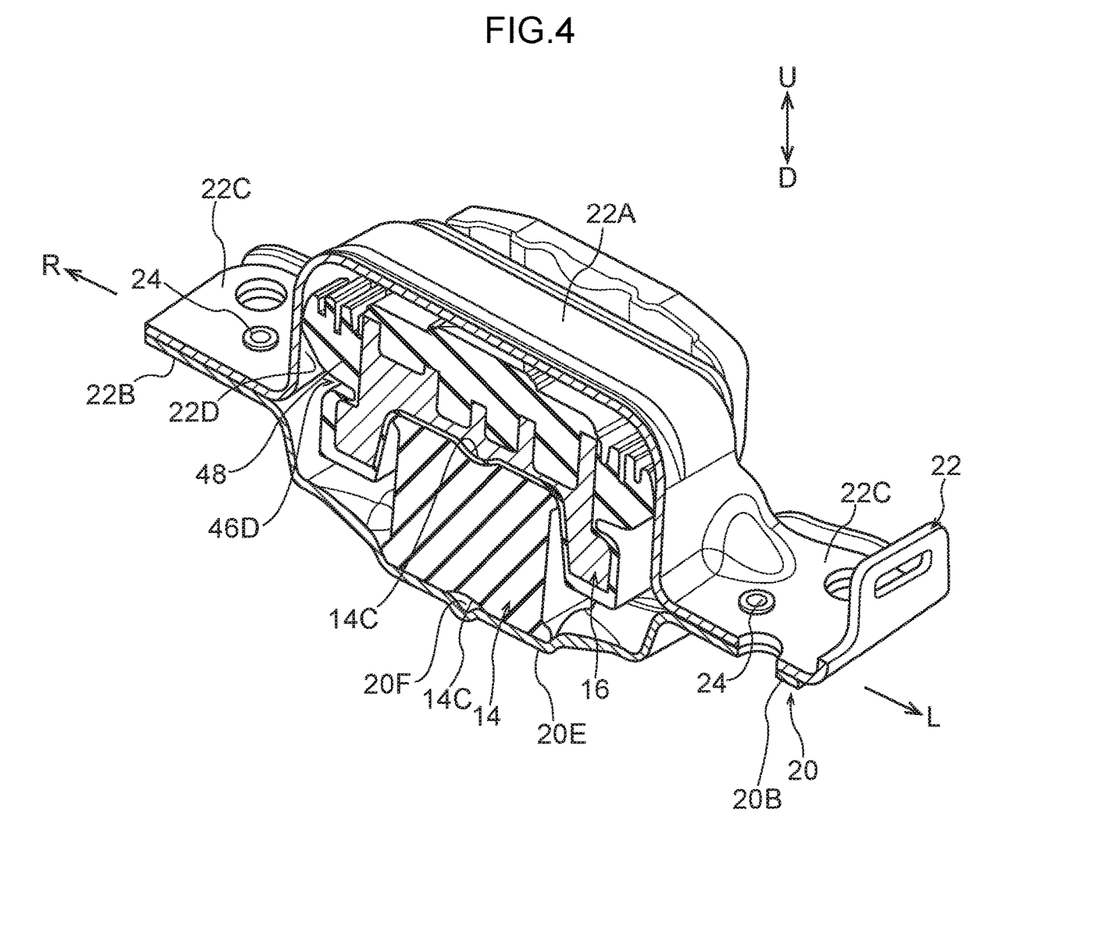
FIG. 4 is a sectional view taken along line A-A in FIG. 3.

A rivet insertion hole 22F and bolt insertion holes 22G are provided at regions of each fixing face 22C of the second bracket 22 corresponding to respective holes 20C and 20D of each fixing face 20B of the first bracket 20. With such a structure, the buffer block 14 and the second attachment member 16 can be sandwiched between the attachment face 20E of the first bracket 20 and the attachment face 22A of the second bracket 22 in a state where each fixing face 20B of the first bracket 20 and each fixing face 22C of the second bracket 22 are fixed with a rivet 24 as also illustrated in FIGS. 3 and 4.

As illustrated in FIG. 2, an insertion face 26 is extended from one side edge of the attachment face 22A of the second bracket 22 toward the first bracket 20.

The buffer block 14 is formed of a rubber member to have a rectangular parallelepiped shape, and a cross-shaped concave groove 14C is formed on each of a top surface 14A and a bottom surface 14B of the buffer block 14.

Figure 5:
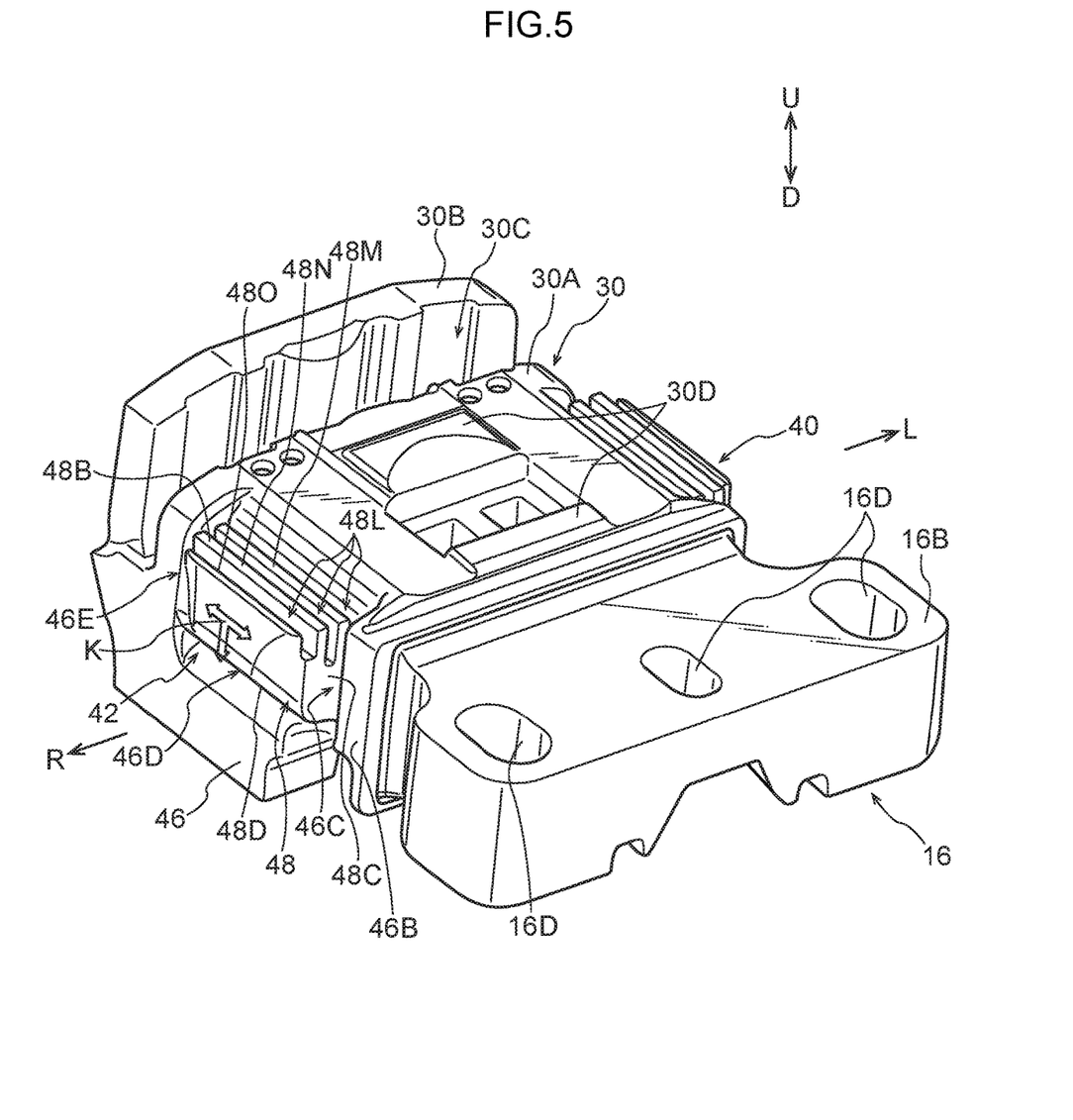
FIG. 5 is a perspective view illustrating the second attachment member of the first embodiment.

As also illustrated in FIG. 5, the second attachment member 16 has a body part (not shown) covered with an elastic member 30, and a fixing portion 16B extended and exposed from the elastic member 30. Attachment holes 16D to be used for attaching to the engine are formed at the fixing portion 16B. The elastic member 30 is made of rubber material, for example, and the second attachment member 16 is made of metal, for example. The second attachment member 16 is formed by insert molding of the body part in the elastic member 30.

The elastic member 30 provided to cover the body part of the second attachment member 16 includes a rectangular elastic member body 30A, and a standing wall 30B is integrally formed on the opposite side in the extension direction of the fixing portion 16B. An insertion groove 30C is formed between the standing wall 30B and the elastic member body 30A, so that the insertion face 26 extended from the attachment face 22A of the second bracket 22 can be inserted into the insertion groove 30C (see FIG. 1). With such a structure, slip-off of the second attachment member 16 is prevented.

Figure 6:
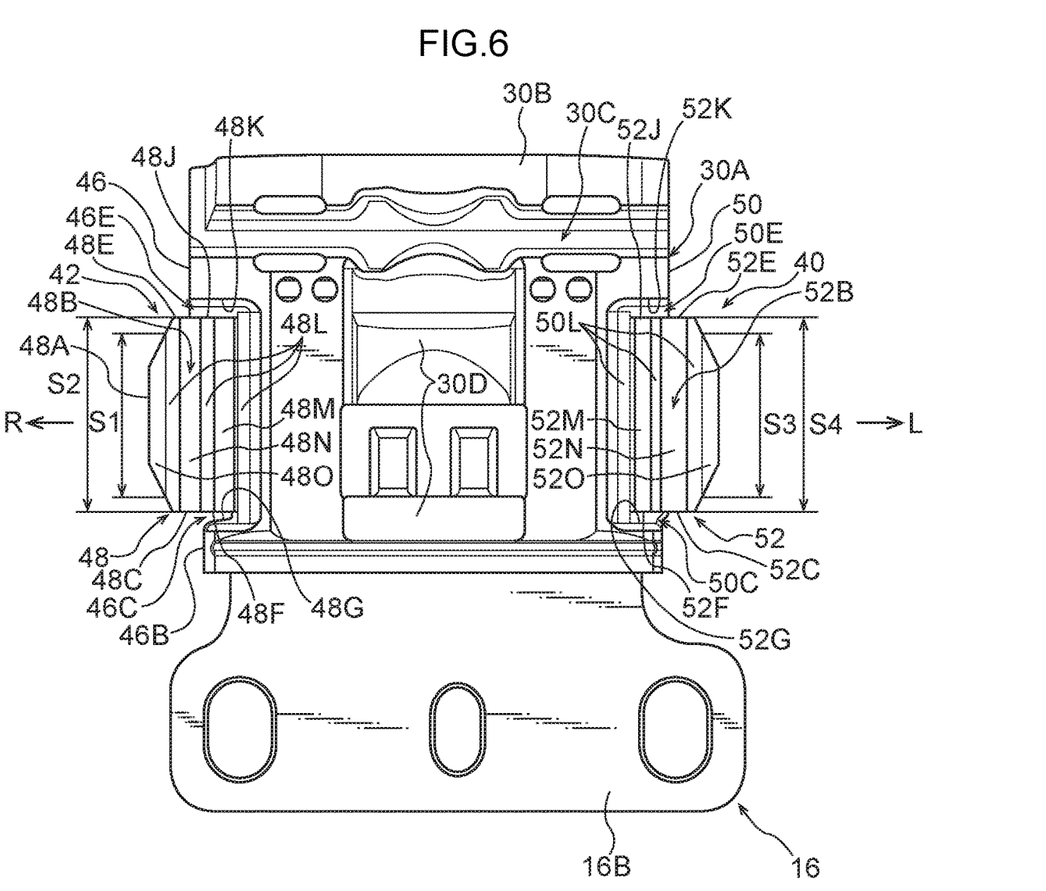
FIG. 6 is a plan view illustrating the second attachment member of the first embodiment.
Figure 7:
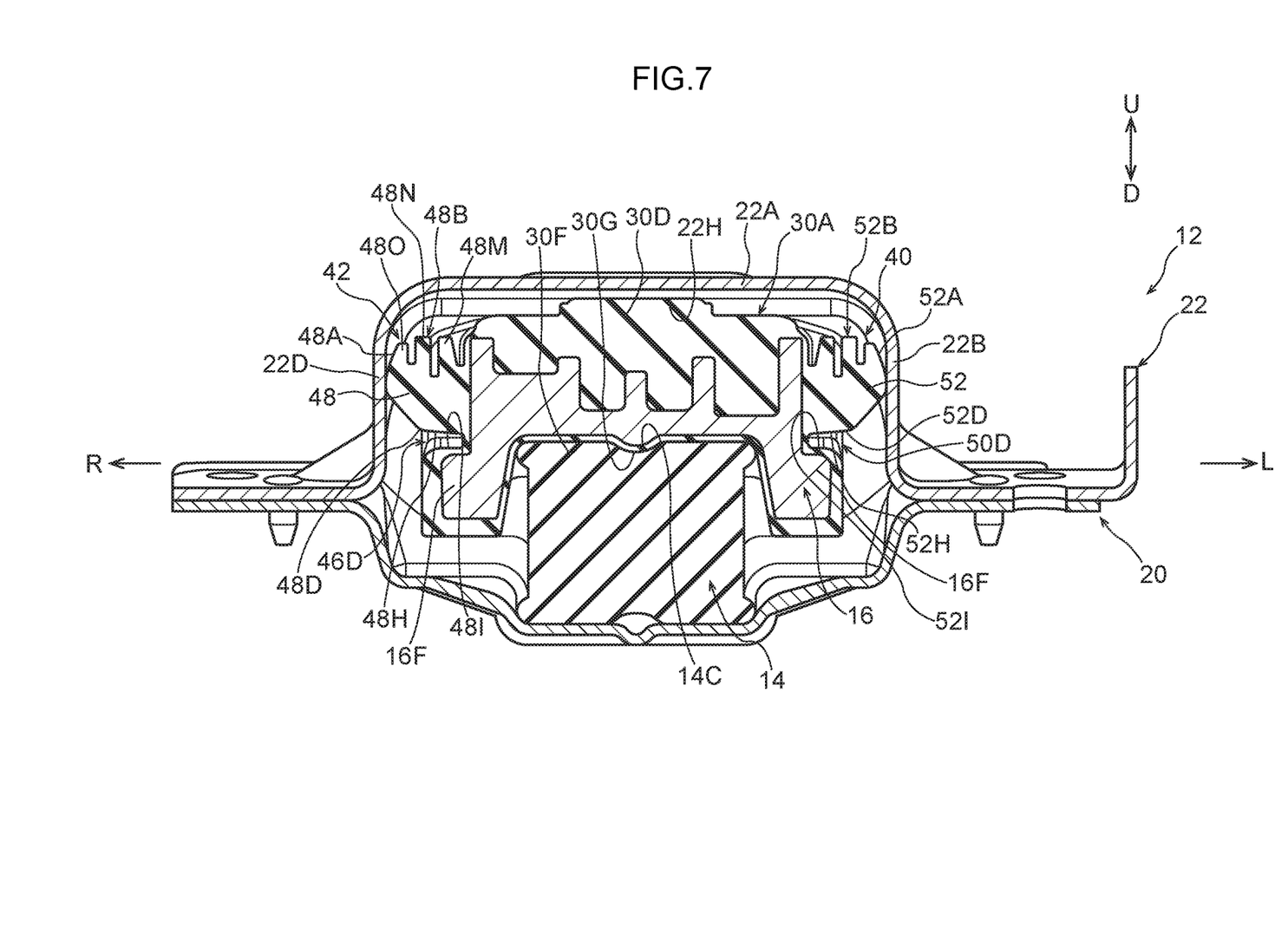
FIG. 7 is a sectional view to be used for explaining the inside of the vibration isolator of the first embodiment.
Figure 8A:
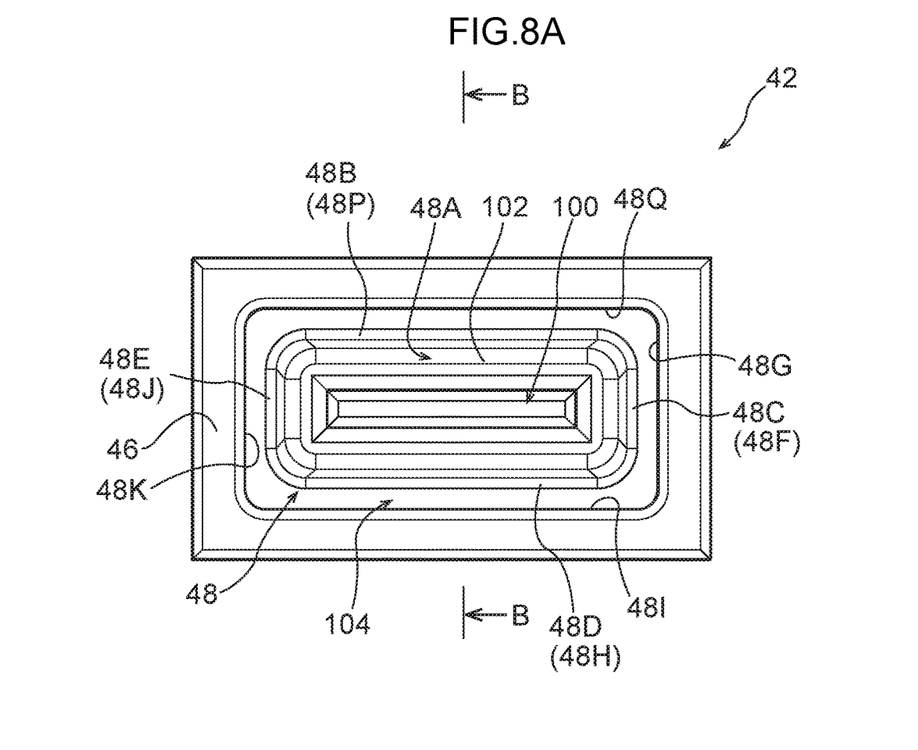
FIG. 8A is a front view illustrating a main part of a second embodiment.
Figure 8B:
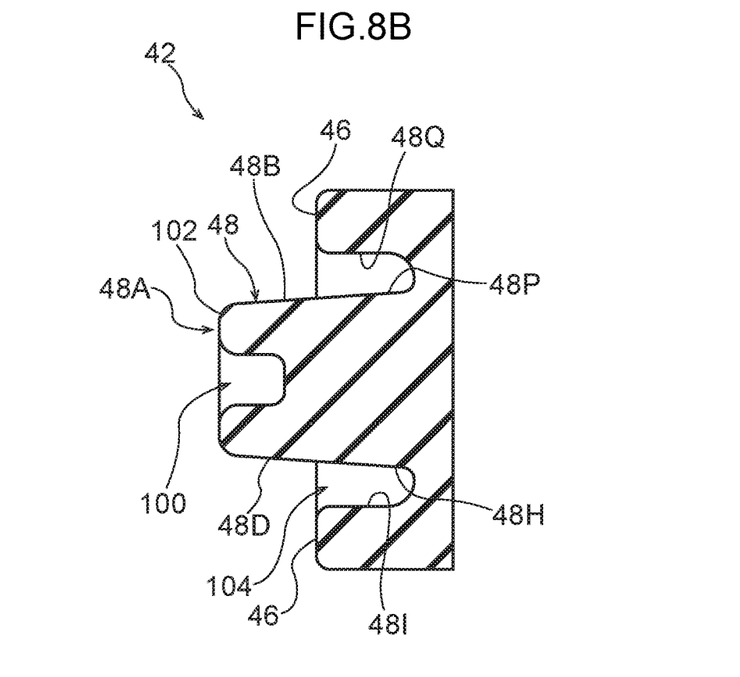
FIG. 8B is a sectional view taken along line B-B in FIG. 8A.
Figure 9A:
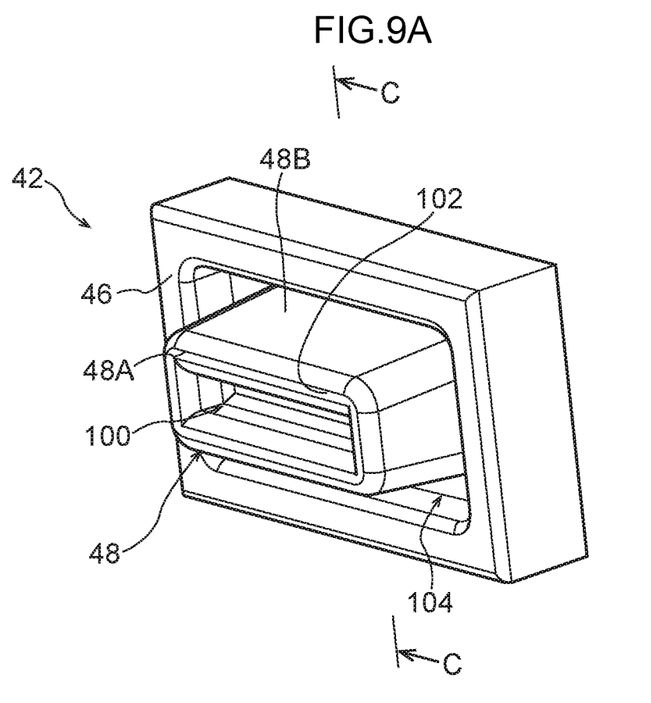
FIG. 9A is a perspective view illustrating the main part of the second embodiment.
Figure 9B:
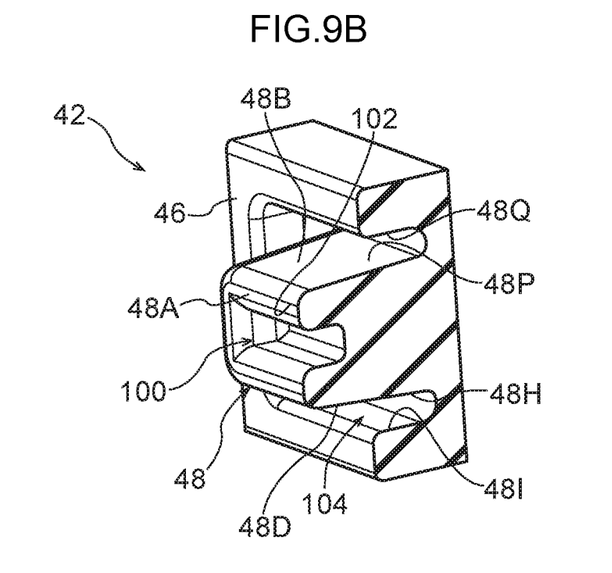
FIG. 9B is a sectional view taken along line C-C in FIG. 9A.

On the upper surface of the elastic member body 30A, a bulging portion 30D is protruded as illustrated in FIGS. 5 and 6. With such a structure, the bulging portion 30D can be pressed toward an inner surface 22H of the attachment face 22A of the second bracket 22 and be positioned in a state where the second attachment member 16 is attached to the first attachment member 12 as illustrated in FIG. 7.

Moreover, a fixing concave portion 30F retracted inward is formed on the lower surface of the elastic member body 30A, and a convex ridge 30G protruded in a cross shape is formed on the ceiling surface of the fixing concave portion 30F. With such a structure, the buffer block 14 can be positioned with respect to the second attachment member 16 by disposing the convex ridge 30G in the concave groove 14C formed on the top surface 14A of the buffer block 14.

A left stopper 40 is provided at a left side portion of the elastic member body 30A, and a right stopper 42 is provided at a right side portion.

As illustrated in FIGS. 5 and 6, the right stopper 42 includes a right convex portion 48, which is an example of a rectangular block-shaped convex portion protruded from a right side surface 46, with reference to the right side surface 46 constituting the outer surface of the elastic member 30. As also illustrated in FIG. 7, the right convex portion 48 is protruded toward the right vertical wall 22D, which is a contact region of the second bracket 22, in a state where the second attachment member 16 is attached to the first attachment member 12. An end face 48A of the right convex portion 48 opposed to the right vertical wall 22D is formed to have a circular arc cross section in which a central portion in the vertical direction is protruded outward.

As illustrated in FIGS. 5 and 6, the circumferential surface of the right convex portion 48 is composed of: a first side wall surface 48B constituting the upper side; a second side wall surface 48C constituting the fixing portion 16B side of the second attachment member 16; a third side wall surface 48D constituting the lower side; and a fourth side wall surface 48E constituting the standing wall 30B side of the elastic member 30.

A step surface 46B is formed at a region of the right side surface 46 of the elastic member body 30A closer to the fixing portion 16B of the second attachment member 16 than the right convex portion 48 and is retracted inward from another region (see FIG. 6). On the step surface 46B, a second concave portion 46C, which is an example of a concave portion extended along the second side wall surface 48C of the right convex portion 48, is recessed toward the left side L (the right side in FIG. 6). As a result, an extension portion 48F is formed on an extension of the second side wall surface 48C of the right convex portion 48, and an opposed face 48G is formed at a region spaced from and opposed to the extension portion 48F.

On the right side surface 46 of the elastic member body 30A, a third concave portion 46D, which is an example of a concave portion extended along the third side wall surface 48D of the right convex portion 48, is recessed toward the left side L as illustrated in FIG. 7. As a result, an extension portion 48H is formed on an extension of the third side wall surface 48D of the right convex portion 48, and an opposed face 48I is formed at a region spaced from and opposed to the extension portion 48H.

Here, a protrusion portion 16F protruded from the side surface of the second attachment member 16 is disposed in the elastic member 30 located on the lower side D of the third concave portion 46D, so that deformation associated with inclination of the right convex portion 48 to the lower side D can be prevented.

Moreover, a fourth concave portion 46E, which is an example of a concave portion extended along the fourth side wall surface 48E of the right convex portion 48, is recessed on the right side surface 46 of the elastic member body 30A toward the left side L as illustrated in FIG. 6. As a result, an extension portion 48J is formed on an extension of the fourth side wall surface 48E of the right convex portion 48, and an opposed face 48K is formed at a region spaced from and opposed to the extension portion 48J.

Each of the concave portions 46C to 46E is provided at a position corresponding to a twisting direction K (see FIG. 5) of twisting to be inputted to the right convex portion 48. Here, the twisting direction K refers to a direction in which the right convex portion 48 is inclined in the lateral direction with respect to the protrusion direction thereof. It is estimated from simulation or the like that input to cause the right convex portion 48 to incline toward the second side wall surface 48C, the third side wall surface 48D, or the fourth side wall surface 48E is applied to the vibration isolator 10 of this embodiment, when used, based on the behavior of the power unit. The respective concave portions 46C to 46E communicate with each other, and a U-shaped groove is formed at an outer circumferential portion of the right convex portion 48.

On the first side wall surface 48B of the right convex portion 48, transverse grooves 48L are formed in three places at equal intervals as illustrated in FIGS. 5 and 6. Between the respective transverse grooves 48L, a first plate portion 48M, a second plate portion 48N, and a third plate portion 48O are formed from the base end side to the tip end side. As a result, a convex-concave shape is formed on the first side wall surface 48B, which is an example of the outer circumferential surface of the right convex portion 48.

As illustrated in FIG. 5, the length S1 of the third plate portion 48O provided on the tip end side of the right convex portion 48 is set shorter than the length S2 of the first plate portion 48M and the second plate portion 48N. With such a structure, the third plate portion 48O can be retracted into a groove formed of the respective concave portions 46C to 46E even when the right convex portion 48 comes into contact with the right vertical wall 22D of the second bracket 22 and the third plate portion 48O is deformed to extend in the longitudinal direction.

The left stopper 40 includes a left convex portion 52, which is an example of a rectangular block-shaped convex portion protruded from a left side surface 50, with reference to the left side surface 50 constituting the outer surface of the elastic member. As also illustrated in FIG. 7, the left convex portion 52 is protruded toward the left vertical wall 22B, which is a contact region of the second bracket 22, in a state where the second attachment member 16 is attached to the first attachment member 12. An end face 52A of the left convex portion 52 opposed to the left vertical wall 22B is formed to have a circular arc cross section in which a central portion in the vertical direction is protruded outward.

As illustrated in FIGS. 6 and 7, the circumferential surface of the left convex portion 52 is composed of: a first side wall surface 52B constituting the upper side; a second side wall surface 52C constituting the fixing portion 16B side of the second attachment member 16; a third side wall surface 52D constituting the lower D side; and a fourth side wall surface 52E constituting the standing wall 30B side of the elastic member 30.

On the left side surface 50 of the elastic member body 30A, a second concave portion 50C extended along the second side wall surface 52C of the left convex portion 52 is recessed toward the right side R as illustrated in FIG. 6. As a result, an extension portion 52F is formed on an extension of the second side wall surface 52C of the left convex portion 52, and an opposed face 52G is formed at a region spaced from and opposed to the extension portion 52F.

On the left side surface 50 of the elastic member body 30A, a third concave portion 50D extended along the third side wall surface 52D of the left convex portion 52 is recessed toward the right side R as illustrated in FIG. 7. As a result, an extension portion 52H is formed on an extension of the third side wall surface 52D of the left convex portion 52, and an opposed face 52I is formed at a region spaced from and opposed to the extension portion 52H.

Here, a protrusion portion 16F protruded from the side surface of the second attachment member 16 is disposed in the elastic member 30 located on the lower side D of the third concave portion 50D, so that deformation associated with inclination of the left convex portion 52 to the lower side D can be prevented.

On the left side surface 50 of the elastic member body 30A, a fourth concave portion 50E extended along the fourth side wall surface 52E of the left convex portion 52 is recessed toward the right side R as illustrated in FIG. 6. As a result, an extension portion 52J is formed on an extension of the fourth side wall surface 52E of the left convex portion 52, and an opposed face 52K is formed at a region spaced from and opposed to the extension portion 52J.

Each of the concave portions 50C to 50E is provided at a position corresponding to a twisting direction of twisting to be inputted to the left convex portion 52. Here, the twisting direction refers to a direction in which the left convex portion 52 is inclined in the lateral direction with respect to the protrusion direction thereof. It is estimated from simulation or the like that input to cause the left convex portion 52 to incline toward the second side wall surface 52C, the third side wall surface 52D, or the fourth side wall surface 52E is applied to the vibration isolator 10 of this embodiment, when used. The respective concave portions 50C to 50E communicate with each other, and a U-shaped groove is formed at an outer circumferential portion of the left convex portion 52.

On the first side wall surface 52B of the left convex portion 52, transverse grooves 52L are formed in three places at equal intervals as illustrated in FIG. 6. Between the respective transverse grooves 52L, a first plate portion 52M, a second plate portion 52N, and a third plate portion 52O are formed from the base end side to the tip end side. As a result, a convex-concave shape is formed on the first side wall surface 52B, which is an example of the outer circumferential surface of the left convex portion 52 (see FIG. 7).

The length S3 of the third plate portion 52O provided on the tip end side of the left convex portion 52 is set shorter than the length S4 of the first plate portion 52M and the second plate portion 52N. With such a structure, the third plate portion 52O can be retracted into a groove formed of the respective concave portions 50C to 50E even when the left convex portion 52 comes into contact with the left vertical wall 22B of the second bracket 22 and the third plate portion 52O is deformed to extend in the longitudinal direction.

The function of this embodiment according to the above configuration will be described.

When vibration from the power unit causes the second attachment member 16 to swing, the respective convex portions 48 and 52 of the elastic member 30 provided at the second attachment member 16 come into contact with the vertical walls 22B and 22D of the second bracket 22 constituting the first attachment member 12. Consequently, each of the convex portions 48 and 52 is elastically deformed to absorb vibration energy.

Here, the respective concave portions 46C to 46E and 50C to 50E are provided on the respective side surfaces 46 and 50 on the base end sides of the respective convex portions 48 and 52, and the length of the respective convex portions 48 and 52 in the protrusion direction can be made longer than a case in which the respective convex portions 48 and 52 are protruded directly from the respective side surfaces 46 and 50. As a result, the deformation volume of each of the convex portions 48 and 52 increases, and the energy absorption amount can be increased.

At this time, when input in the twisting direction is applied to each of the convex portions 48 and 52, each of the convex portions 48 and 52 is inclined in a direction corresponding to the twisting direction. Then, the respective wall surfaces 48C to 48E and 52C to 52E on the base end sides of the respective convex portions 48 and 52, or the respective extension portions 48F, 48H, 48J, 52F, 52H, and 52J come into contact with the opposed faces 48G, 48I, 48K, 52G, 52I, and 52K formed of the respective concave portions 46C to 46E and 50C to 50E. As a result, each of the convex portions 48 and 52 is supported from the lateral direction, and inclination more than necessary is suppressed.

Accordingly, it is possible to suppress breakage of base end portions of the respective convex portions 48 and 52, which can occur when the convex portions 48 and 52 are simply lengthened and become more likely to be inclined, without applying any special countermeasure. Therefore, the durability against input in the twisting direction can be enhanced.

On the other hand, when input in the longitudinal direction is applied to each of the convex portions 48 and 52 at the time of vibration input, each of the convex portions 48 and 52 is deformed to extend in the lateral direction by force in the compression direction. At this time, the respective concave portions 46C to 46E and 50C to 50E, which are formed on the base end sides of the respective convex portions 48 and 52, function as escapes for deformed parts of the respective convex portions 48 and 52. As a result, it is possible to suppress local distortion of each of the convex portions 48 and 52.

Moreover, the respective concave portions 46C to 46E and 50C to 50E are provided at positions corresponding to the twisting directions of twisting to be inputted to the respective convex portions 48 and 52. Therefore, it is possible to effectively exhibit the effect of preventing excessive inclination of each of the convex portions 48 and 52 with respect to input in the twisting direction.

Each of the first side wall surfaces 48B and 52B of the respective convex portions 48 and 52 is formed to have a convex-concave shape, and each of the convex portions 48 and 52 is easily deformed. As a result, it becomes easy to absorb energy at each of the convex portions 48 and 52.

Although the respective concave portions 46C to 46E and 50C to 50E are provided in three directions on side portions of the respective convex portions 48 and 52 in this embodiment, it is to be noted that the present invention is not limited to this. Moreover, although a case in which the first side wall surfaces 48B and 52B of the respective convex portions 48 and 52 are each formed to have a convex-concave shape has been described, the present invention is not limited to this.

Second Embodiment

FIGS. 8A, 8B, 9A, and 9B are views illustrating a second embodiment, in which the structure of the respective stoppers 40 and 42 provided at the elastic member 30 is different from that of the first embodiment. Therefore, in this embodiment, the same or equivalent parts to those in the first embodiment are denoted by the same reference numerals, description thereof will be omitted, and only different parts will be described. Although only the right stopper 42 of the first embodiment will be described in the following description, it is to be noted that the left stopper 40 has the same structure.

That is, a concave groove 100 having a laterally elongated rectangular shape is formed on the end face 48A of the right convex portion 48 of the right stopper 42 according to this embodiment, and the concave groove 100 and a general portion 102 of the end face 48A constituting an outer circumferential portion form a convex-concave shape. In other words, irregularities are provided on a side surface, which is an example of the surface of the right convex portion 48.

Moreover, a concave portion 104 is formed on the right side surface 46, which is provided with the right convex portion 48, along the circumferential edge of the right convex portion 48, and the right convex portion 48 is surrounded by the concave portion 104. As an example, the concave portion 104 is extended along at least two directions orthogonal to the protrusion direction of the right convex portion 48 so as to cover a circumference of the right convex portion 48. As a result, extension portions 48F, 48H, 48J, and 48P are formed on extensions of the respective side wall surfaces 48B to 48E of the right convex portion 48, and opposed faces 48Q 48I, 48K, and 48Q are formed at regions opposed to the respective extension portions 48F, 48H, 48J, and 48P. Here, the extension portion 48P is formed on an extension of the first side wall surface 48B constituting the upper side of the right convex portion 48.

With such a configuration, it is also possible to obtain the same functions and effects as those of the first embodiment. Moreover, since the concave portion 104 is provided so as to surround the right convex portion 48, it is also possible to exert effects for input in any twisting direction, and the durability can be enhanced.

On the other hand, when input in the protrusion direction is applied to the right convex portion 48 at the time of vibration input, the right convex portion 48 is deformed to extend in the lateral direction by force in the compression direction. At this time, the concave portion 104, which is formed on the base end side of the right convex portion 48, functions as an escape for a deformed part of the right convex portion 48. As a result, it is possible to suppress local distortion of the right convex portion 48.

Figure 10:
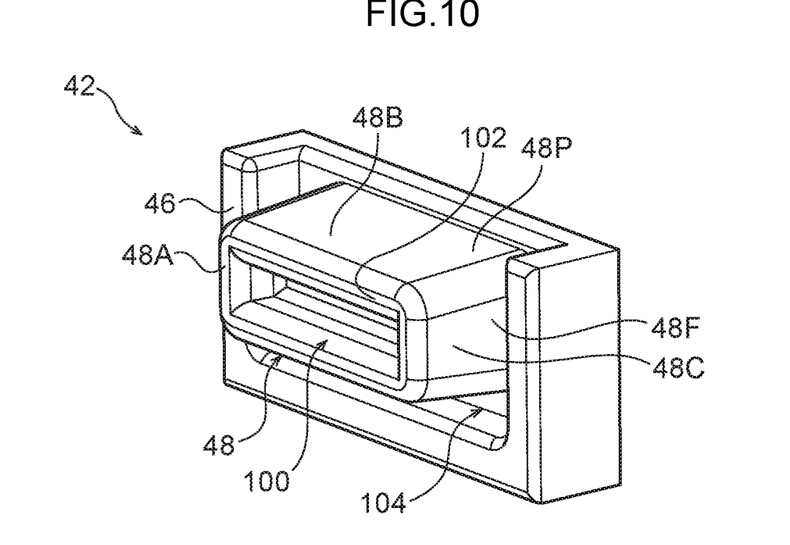
FIG. 10 is a perspective view illustrating a main part of a variation of the second embodiment.

It is to be noted that at least a part of the extension portion may have a configuration not having an opposed face as in a variation illustrated in FIG. 10. In such an example, the extension portion 48F does not have an opposed face, and the upper side is open. Since favorable demolding property from molds in the vertical direction is obtained, the part of the right stopper 42 can be formed using upper and lower molds.

Although the first and second embodiments have been described using an example in which the right convex portion 48 and the left convex portion 52 come into contact with the first attachment member 12 at the time of non-vibration in which no vibration is inputted into the vibration isolator 10, it is to be noted that the present invention is not limited to this. A vibration isolator 10 in which the right convex portion 48 and the left convex portion 52 do not come into contact with the first attachment member 12 at the time of non-vibration can be cited as another embodiment.

Moreover, the positions where the right convex portion 48 and the left convex portion 52 are provided are not limited to the outer surface of the elastic member 30. For example, the right convex portion 48 and the left convex portion 52 may be provided on the upper surface of the elastic member 30.

The disclosure of Japanese Patent Application No. 2016-113838 filed on Jun. 7, 2016, is incorporated herein by reference in its entirety.

All documents, patent applications, and technical standards described in this specification are incorporated herein by reference to the same extent as a case in which individual documents, patent applications, and technical specifications are specifically and individually referred to be incorporated by reference.

The invention claimed is:

1. A vibration isolator comprising:
a first attachment member to be attached to one of a vibration generating unit or a vibration receiving unit;
a second attachment member to be attached to another of the vibration generating unit or the vibration receiving unit;
an elastic member that is provided at the second attachment member and elastically connects the first attachment member and the second attachment member;
a convex portion protruded toward the first attachment member with reference to an outer surface of the elastic member opposed to the first attachment member; and
a concave portion that is recessed in the same direction as a protruding direction of the convex portion,
wherein the concave portion is formed as a void space at a region of the outer surface positioned on a base end side of the convex portion, that forms an extension portion at a side wall portion of the convex portion, and that forms an opposed face opposed to the extension portion.

2. The vibration isolator according to claim 1, wherein the concave portion is provided at a position corresponding to a twisting direction of the convex portion.

3. The vibration isolator according to claim 1, wherein irregularities are provided on a surface of the convex portion.

4. The vibration isolator according to claim 3, wherein the irregularities are provided on a side surface of the convex portion.

5. The vibration isolator according to claim 1, wherein the concave portion is extended along at least two directions orthogonal to a protrusion direction of the convex portion so as to cover a circumference of the convex portion.

6. The vibration isolator according to claim 1, wherein at least a part of the extension portion does not have the opposed face.

7. The vibration isolator according to claim 1, wherein the concave portion is provided at a position corresponding to a twisting direction of the convex portion; and
irregularities are provided on a surface of the convex portion.

8. The vibration isolator according to claim 1, wherein the concave portion is provided at a position corresponding to a twisting direction of the convex portion; and
the concave portion is extended along at least two directions orthogonal to a protrusion direction of the convex portion so as to cover a circumference of the convex portion.

9. The vibration isolator according to claim 1, wherein the concave portion is provided at a position corresponding to a twisting direction of the convex portion; and
at least a part of the extension portion does not have the opposed face.

10. The vibration isolator according to claim 1, wherein the concave portion is provided at a position corresponding to a twisting direction of the convex portion;
irregularities are provided on a surface of the convex portion; and
the irregularities are provided on a side surface of the convex portion.

11. The vibration isolator according to claim 1, wherein the concave portion is provided at a position corresponding to a twisting direction of the convex portion;
irregularities are provided on a surface of the convex portion; and
the concave portion is extended along at least two directions orthogonal to a protrusion direction of the convex portion so as to cover a circumference of the convex portion.

12. The vibration isolator according to claim 1, wherein the concave portion is provided at a position corresponding to a twisting direction of the convex portion;
irregularities are provided on a surface of the convex portion; and
at least a part of the extension portion does not have the opposed face.

13. The vibration isolator according to claim 1, wherein the concave portion is provided at a position corresponding to a twisting direction of the convex portion;
irregularities are provided on a surface of the convex portion;
the irregularities are provided on a side surface of the convex portion; and
the concave portion is extended along at least two directions orthogonal to a protrusion direction of the convex portion so as to cover a circumference of the convex portion.

14. The vibration isolator according to claim 1, wherein the concave portion is provided at a position corresponding to a twisting direction of the convex portion;
irregularities are provided on a surface of the convex portion;
the irregularities are provided on a side surface of the convex portion; and
at least a part of the extension portion does not have the opposed face.

15. The vibration isolator according to claim 1, wherein the concave portion is provided at a position corresponding to a twisting direction of the convex portion;
irregularities are provided on a surface of the convex portion;
the irregularities are provided on a side surface of the convex portion;
the concave portion is extended along at least two directions orthogonal to a protrusion direction of the convex portion so as to cover a circumference of the convex portion; and
at least a part of the extension portion does not have the opposed face.

* * * * *